United States Patent
Erpelding

(10) Patent No.: US 7,110,222 B2
(45) Date of Patent: Sep. 19, 2006

(54) SYSTEM AND APPARATUS FOR ASSEMBLING HARD DISK DRIVE INTEGRATED LEAD SUSPENSIONS TO ARM ELECTRONICS CABLES VIA ADDITIONAL DEGREES OF FREEDOM AT THE TAIL TERMINATION AND IMPEDANCE GROOMING THEREOF

(75) Inventor: A. David Erpelding, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 185 days.

(21) Appl. No.: 10/600,638

(22) Filed: Jun. 20, 2003

(65) Prior Publication Data

US 2004/0257708 A1 Dec. 23, 2004

(51) Int. Cl.
*G11B 5/48* (2006.01)
(52) U.S. Cl. .................. 360/264.2; 360/245.9
(58) Field of Classification Search ............ 360/245.9, 360/264.2, 266.3
See application file for complete search history.

(56) References Cited

U.S. PATENT DOCUMENTS

| 5,631,786 | A | * | 5/1997 | Erpelding | 360/97.01 |
| 6,212,046 | B1 | | 4/2001 | Albrecht et al. | |
| 6,477,014 | B1 | * | 11/2002 | Erpelding | 360/245.9 |
| 6,529,350 | B1 | * | 3/2003 | Itoh | 360/264.2 |
| 6,543,673 | B1 | * | 4/2003 | Lennard et al. | 228/179.1 |
| 6,807,029 | B1 | * | 10/2004 | Someya | 360/245.9 |

* cited by examiner

*Primary Examiner*—A. J. Heinz
(74) *Attorney, Agent, or Firm*—Bracewell & Giuliani LLP

(57) ABSTRACT

A system, apparatus, and method of terminating an integrated lead suspension (ILS) tail to an arm electronics cable allows plated solder material to be utilized on the ILS pads by providing additional degrees of freedom for the solder pads on the ILS tail. The additional degrees of freedom provide additional compliance between the individual pairs of solder pads that form the solder joints. In addition to a cantilever spring action in the ILS tail, the invention comprises designs that allow each individual pad to move independently out of plane of the tail as well as providing a twist capability about its axis such that each pad has its own gimbal structure.

25 Claims, 7 Drawing Sheets

US 7,110,222 B2

SYSTEM AND APPARATUS FOR ASSEMBLING HARD DISK DRIVE INTEGRATED LEAD SUSPENSIONS TO ARM ELECTRONICS CABLES VIA ADDITIONAL DEGREES OF FREEDOM AT THE TAIL TERMINATION AND IMPEDANCE GROOMING THEREOF

BACKGROUND OF THE INVENTION

1. Technical Field

The present invention relates in general to an improved hard disk drive and, in particular, to an improved system, apparatus, and method of assembling hard disk drive integrated lead suspensions to arm electronics cables in hard disk drives via additional degrees of freedom at the tail terminations.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

In the prior art, the current preferred method of accomplishing the termination of the integrated lead suspension (ILS) to an arm electronics (A/E) cable of the disk drive is to use a solder joint. The solder joint is a right-angle fillet joint, formed between the ILS tail and the A/E cable. The current technology for forming this joint is well documented in U.S. Pat. No. 6,212,046, to Albrecht, et al. Current solder terminations rely upon flattened solder pads on the ILS tail to accommodate height variations of the mating A/E solder pads. The height variations can be due to manufacturing variations in the solder pads on the A/E cable and/or solder pad variations on the ILS tail. Angular displacement of the ILS tail with respect to the A/E solder pads can also create height variations. The flattened solder pads on the ILS tail will increase their height upon heating as surface tension of the molten solder pulls the flattened pads into approximate spheres. This increase in height allows the molten solder on the ILS tail to contact the mating solder pads on the A/E cable and form a joint. Although the current process is fairly robust, it has an associated rework rate due to excessive gaps between mating pads due to aforementioned causes. Another limitation to this process is that the ILS manufacturers are limited to a solder screening process to assure that a sufficient volume of solder is applied.

Referring to FIGS. 1–7, a prior art design for an ILS tail 11 is shown. ILS tail 11 has a single large solid platform 10 (FIG. 6) of steel to support the copper pads 14 (eight shown in FIG. 5), with a single large solid insulator 13 (FIG. 7) or dielectric therebetween. Solder pads 15 are applied to copper pads 14 by a screening process. Ideally, the ILS tail 11 matches and interacts with the solder pads 17 (FIG. 3) on the A/E cable 19 and form a 90-degree fillet joint, as shown in FIG. 4. The ILS tails 11 are oriented horizontally and the A/E cable 19 is oriented vertically and, thus, are oriented at 90-degrees relative to each other. Initially, the ILS tails 11 are biased (e.g., sprung) against each other and restrained in this manner as they are inserted into the angled slots 23 formed in the A/E cable 19. When released, the solder pads 15 of the ILS tails 11 are loaded or biased (see arrows 21) against the solder pads 17 of the A/E cable 19.

As described in U.S. Pat. No. 6,212,046, and as shown in FIG. 5, each ILS tail 11 has a layer of steel 10, a layer of polyimide 13, copper pads 14, and flattened solder pads 15. When heated, the solder pads 15 become molten and increase in height. The molten state of the thick solder pads 15, in conjunction with the spring load of the ILS tail 11, allows the solder pads 15 to accommodate (within certain limits) any gaps or non-mating conditions between the ILS tails and the A/E cable 19. In the prior art, compliance between ILS pads and A/E cables is provided only for all of the pads in unison, which is primarily supplied by the cantilever spring action of the tails. The full laminate thickness of the tails acts as a spring for the tails. However, as shown in FIG. 5, the spring load 21 is unable to overcome all gaps 25 and non-mating conditions between the ILS tails 11 and the A/E cable 19. Although the conventional method described above for terminating ILS tails to A/E cables has been used in production since 1996, the need for rework or "touch-up" has not been overcome and still exists today. For example, at the pad level, the incidence of rework is relatively low (approximately 1.5% or less). However, when the rework rate is calculated at the head stack assembly level, the rework rate is sizable and can exceed 15%.

Although it would be desirable and even preferable to use a plating process on the ILS pads instead of the conventional and thicker solder screening process, the plating process forms pads that are an entire order of magnitude thinner than solder pads. As a result, plated pads produce a smaller volume of solder than what is required and provided by the currently preferred method of screened solder terminations. Consequently, the benefits of the plating process, which include less oxidation, elimination of the toxic material lead (Pb), and a greater choice of solder alloys, cannot be realized. Thus, an improved system, apparatus, and method of terminating ILS tails to A/E cables is needed that would allow the solder pads to be plated onto the ILS tails would be desirable.

SUMMARY OF THE INVENTION

One embodiment of a system, apparatus, and method of terminating an integrated lead suspension (ILS) tail to an arm electronics (A/E) cable allows plated solder material to be utilized on the ILS pads by providing two additional degrees of freedom for the solder pads on the ILS tail. The additional degrees of freedom provide additional compliance between the individual pairs of solder pads that form the solder joints. In addition to a cantilever spring action in the ILS tail, the present invention comprises designs that allow each individual pad to move independently out of plane of the tail as well as providing a twist capability about its axis. In this way, each pad has its own gimbal structure, which may be provided through various embodiments.

Since a change in the solder pad height is not required with the present invention in order to achieve termination, plated solder with environmental friendly, lead-free alloys can be used. However, if traditional screening of a solder alloy is still desired, the present invention may be implemented with only slight changes to the solder screening tooling. For example, currently, the continuous steel under the solder pads supports the copper ILS pads during the solder screening process. The solder is screened onto the ILS pads while all of the ILS suspensions are still in their panel form. The panel of ILS suspensions and their tails are aligned to the solder screening mask and registered against a platen. The platen requires raised portions coinciding with the ILS pad regions to support the copper pads during the solder screening process. This support is required so that the ILS copper pads do not deflect out of contact with the solder screen and, hence, produce solder bridging. Normally, solder bridging would result with prior art solder mask designs and processes.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF A PREFERRED EMBODIMENT

Figure 1:
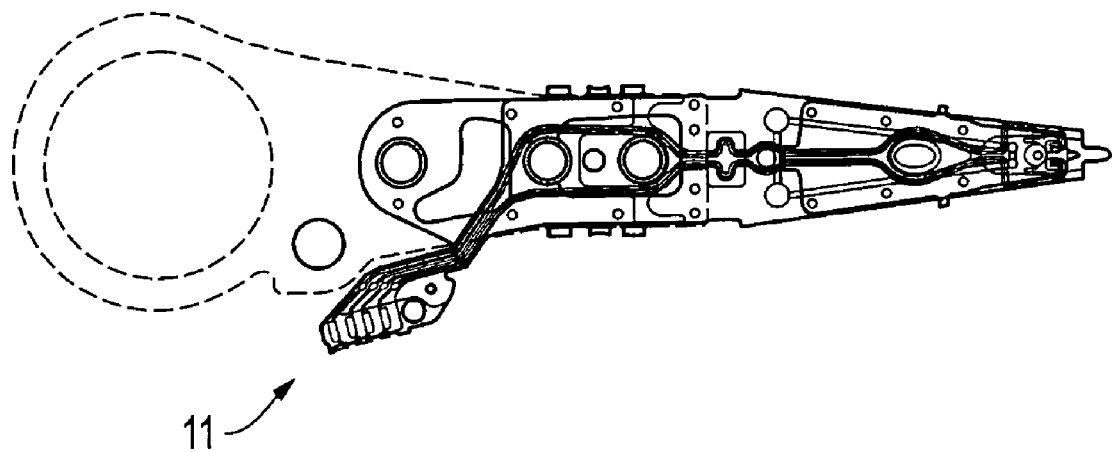
FIG. 1 is a plan view of an integrated lead suspension (ILS) having a conventional tail termination.
Figure 2:
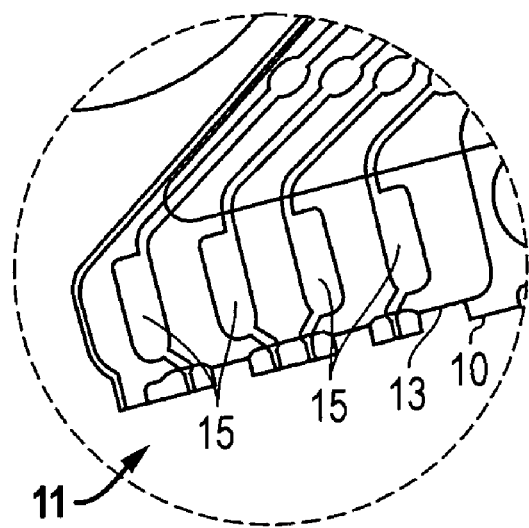
FIG. 2 is an enlarged plan view of the conventional ILS tail termination of FIG. 1.
Figure 4:
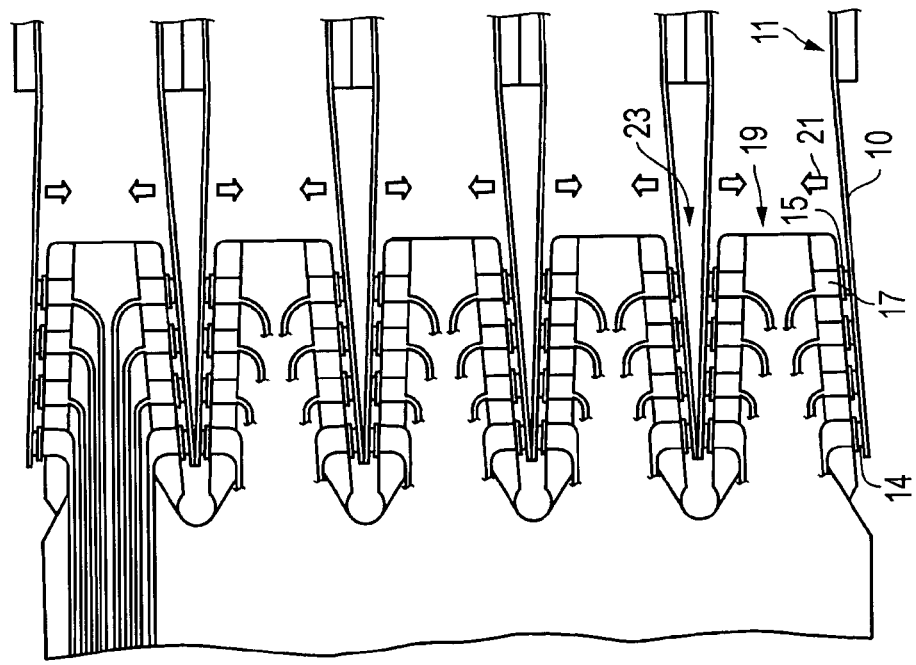
FIG. 4 illustrates a plurality of the conventional ILS tail terminations of FIG. 2 being joined to the A/E cable of FIG. 3, while oriented at 90-degrees relative to each other.
Figure 3:
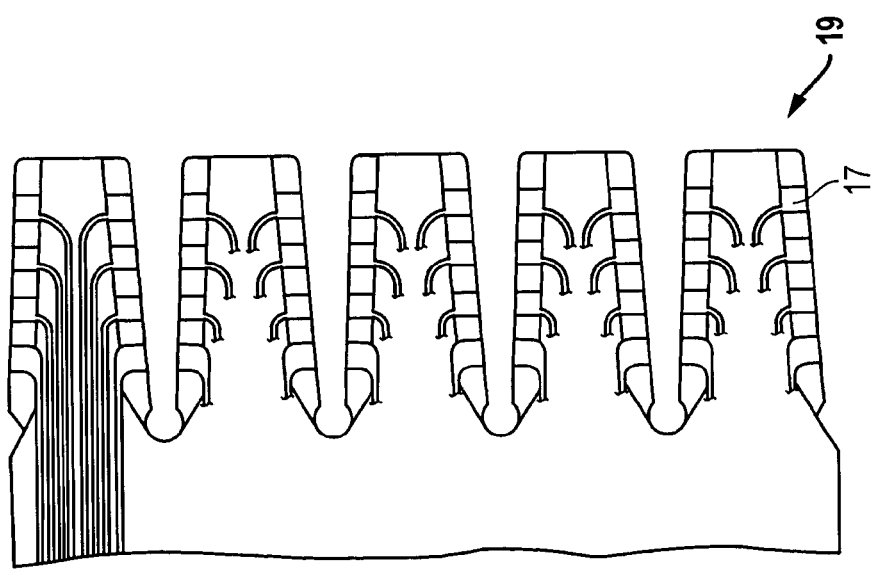
FIG. 3 is a plan view of a conventional arm electronics (A/E) cable.
Figure 5:
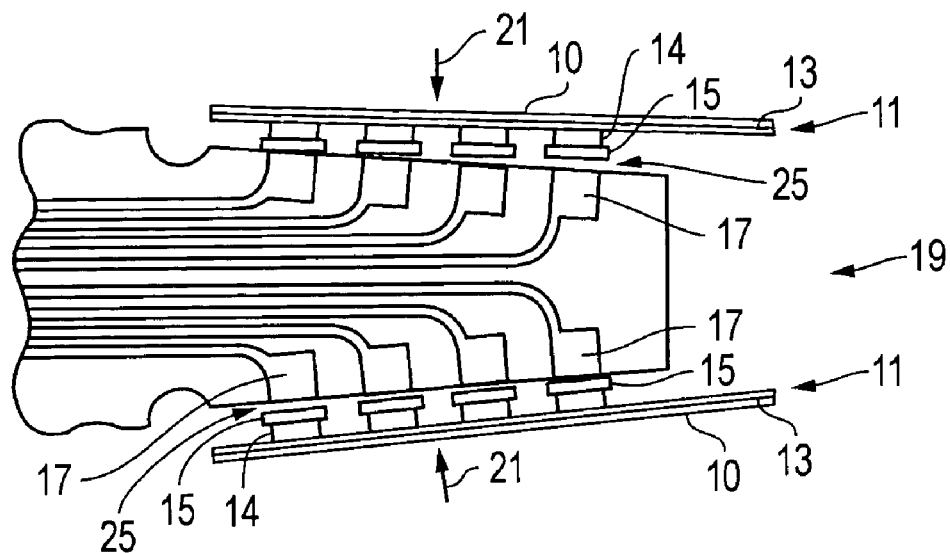
FIG. 5 illustrates the unacceptable gaps that can form between a pair of the conventional ILS tail terminations and A/E cables of FIG. 4.
Figure 6:
FIG. 6 is a plan view of a conventional steel support platform for the ILS tail termination of FIG. 2.
Figure 7:
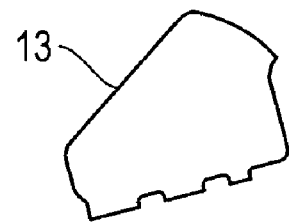
FIG. 7 is a plan view of a conventional insulator for the ILS tail termination of FIG. 2.
Figure 8:
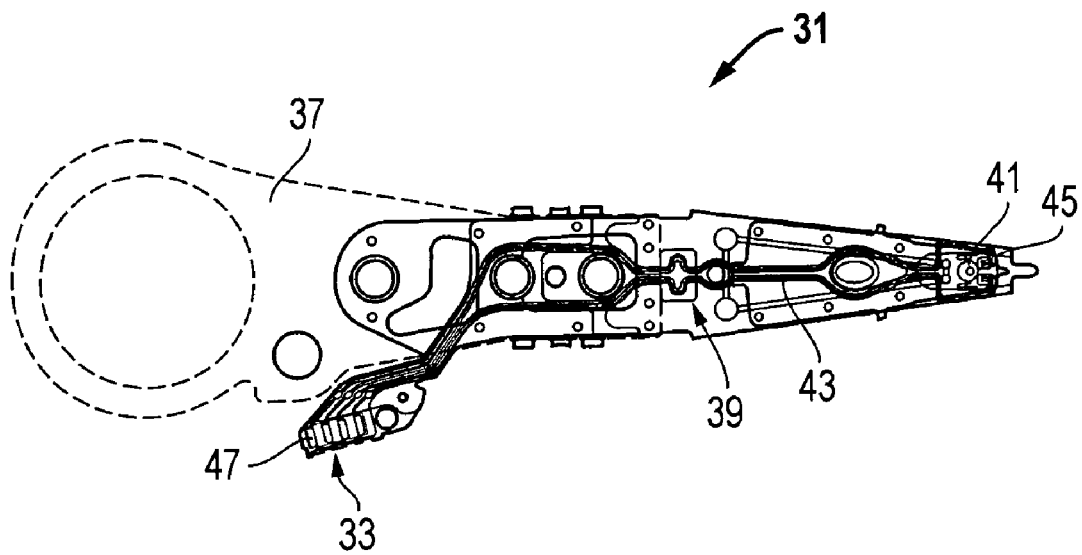
FIG. 8 is a plan view of one embodiment of an integrated lead suspension (ILS) having a tail termination constructed in accordance with the present invention.

Referring now to FIGS. 8–11 and 18, one embodiment of a system, method, and apparatus for terminating the tail 33 of an integrated lead suspension 39 to an arm electronics cable 35 (FIG. 18) for a hard disk drive is shown. In the embodiment illustrated, a head gimbal assembly 31 comprises the integrated lead suspension 39 mounted to a mounting device 37, such as a unimount arm, and the read/write head 41 mounted to the integrated lead suspension 39. The mounting device 37 may also comprise other types of attachment schemes such as those commonly known in the art. The head gimbal assembly 31 has a read/write head 41, the tail 33, and a plurality (four shown) of conductors 43. Each of the conductors 43 has a first end 45 electrically interconnected with and extending from the read/write head 41, and a second end 47 with an axis 49. The tail 33 supports the second ends 47 of the conductors 43.

Figure 9:
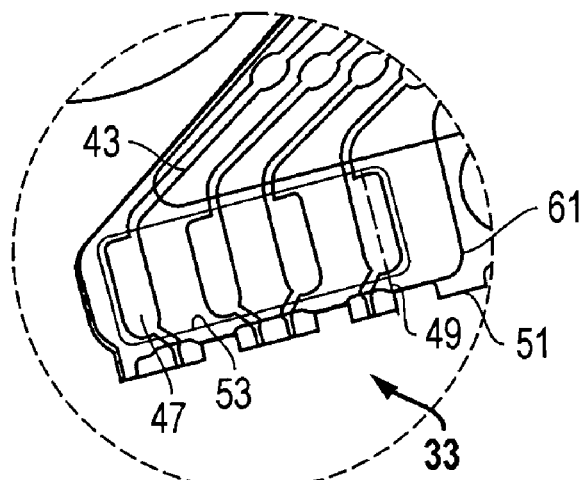
FIG. 9 is an enlarged plan view of the ILS tail termination of FIG. 8.
Figure 10:
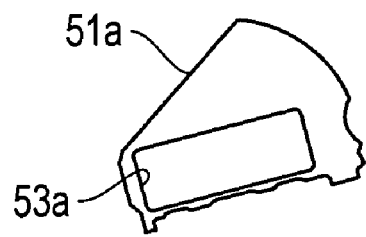
FIG. 10 is a plan view of a support platform for the ILS tail termination of FIG. 9 and is constructed in accordance with the present invention.
Figure 11:
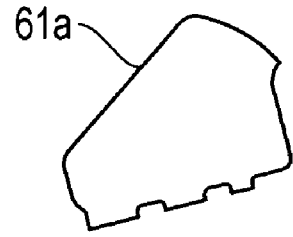
FIG. 11 is a plan view of an insulator for the ILS tail termination of FIG. 9 and is constructed in accordance with the present invention.

As shown in FIGS. 9–11, the tail 33 further comprises a support layer 51 that is typically formed from stainless steel. According to the present invention, the support layer 51 has at least one aperture 53 formed therein for allowing the second ends 47 of the conductors 43 to move independently with respect to other ones of the second ends 47 of the conductors 43. In the embodiment of FIGS. 9 and 10, the at least one aperture 53a in support layer 51a comprises a single, generally rectangular opening for accommodating independent movement of all of the second ends 47 of the conductors 43.

Figure 12:
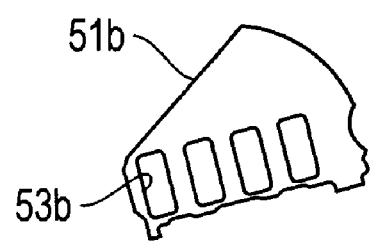
FIG. 12 is a plan view of an alternate embodiment of a support platform for the ILS tail termination of FIG. 9 and is constructed in accordance with the present invention.
Figure 13:
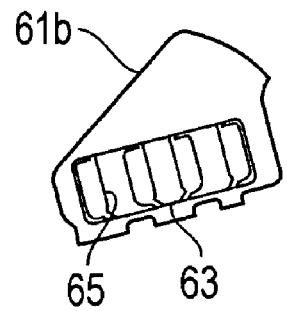
FIG. 13 is a plan view of an alternate embodiment of an insulator for the ILS tail termination of FIG. 9 and is constructed in accordance with the present invention.
Figure 14:
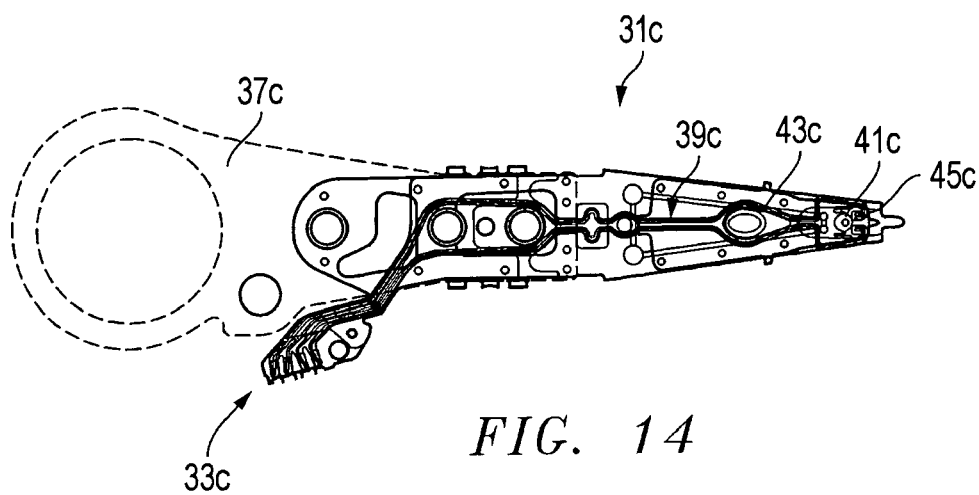
FIG. 14 is a plan view of another embodiment of an integrated lead suspension (ILS) having a tail termination constructed in accordance with the present invention.

In one alternate embodiment (FIG. 12), the at least one aperture 53b in support layer 51b comprises a plurality (four shown) of smaller, generally rectangular apertures or openings, each of which accommodates independent movement of one of the second ends 47 of the conductors 43. The tail 33 also has an insulation layer 61 (typically formed from polyimide or other insulating or dielectric materials) that is formed between portions of the conductors 43 and the support layer 51 for preventing contact therebetween. Two embodiments of insulation layer 61 are illustrated in the figures. In the embodiment of FIG. 11, insulation layer 61a is solid and, in the embodiment of FIG. 13, insulation layer 61b has a generally rectangular opening 63 and a plurality of smaller generally rectangular insulation pads 65 formed in the opening 63 for preventing contact between the support layer 51 and the second ends 47 of the conductors 43. These embodiments of the tail 33, conductors 43, support layer 51, and insulation layer 61 may be joined in different combinations.

In another alternate embodiment of the present invention (FIGS. 14–17), a head gimbal assembly 31c comprises the integrated lead suspension 39c with a tail 33c and a plurality of conductors 43c, mounted to a mounting device 37c (described above), with read/write head 41c attached. Each of the conductors 43c has a first end 45c electrically interconnected with and extending from the read/write head 41c, and a second end 47c with an axis 49c. The tail 33c supports the second ends 47c of the conductors 43c. In this embodiment, the at least one aperture 53c in the support layer 51c is a single asymmetrical opening that is contoured to a shape of all of the second ends 47c of the conductors 43c to define a plurality of apertures 53c for accommodating independent movement of all of the second ends 47c of the conductors 43c. The support layer 51c also has a plurality of fingers 55, each of which extends into one of the plurality of apertures 53c for providing additional support for a respective one of the second ends 47c of the conductors 43c. The insulation layer 61c, which may comprises various embodiments, is located between at least portions of the conductors 43c and the support layer 51c, including fingers 55, to prevent contact therebetween.

Figure 15:
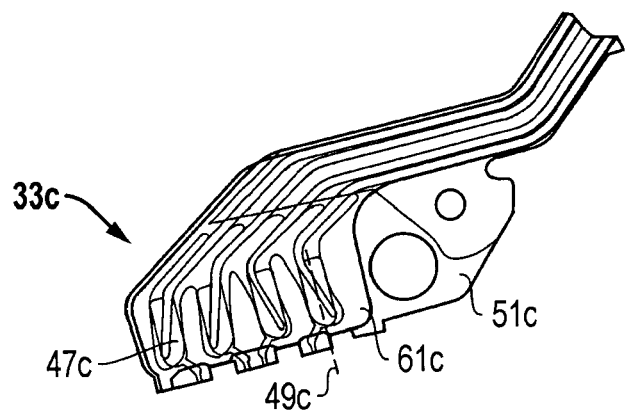
FIG. 15 is an enlarged plan view of the ILS tail termination of FIG. 14.
Figure 16:
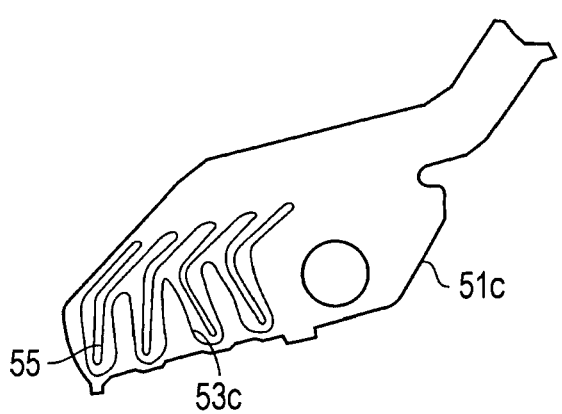
FIG. 16 is a plan view of a support platform for the ILS tail termination of FIG. 14 and is constructed in accordance with the present invention.
Figure 17:
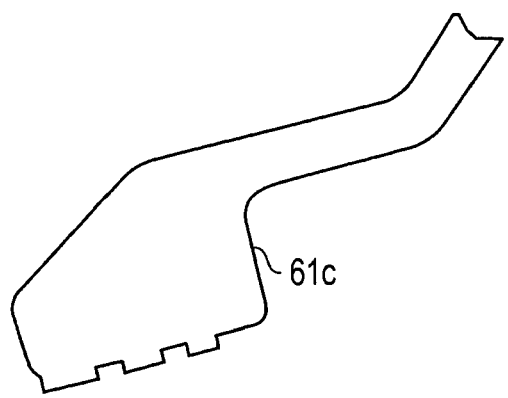
FIG. 17 is a plan view of an insulator for the ILS tail termination of FIG. 14 and is constructed in accordance with the present invention.
Figure 18:
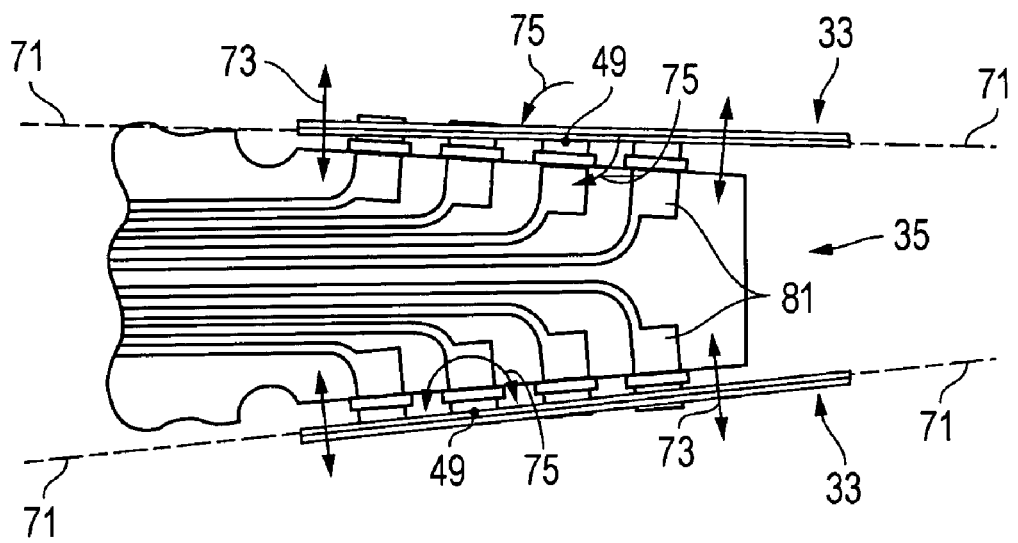
FIG. 18 illustrates ILS tail terminations of the present invention being joined to A/E cables while oriented at 90-degrees relative to each other and is constructed in accordance with the present invention.

FIGS. 14–17 also represent the preferred approach to creating gimbals under the termination pads. The cantilevered fingers 55 are formed from the steel layer (FIG. 16), and follow and mimic the width and routing of the conductor traces 47c (FIG. 15). This approach allows for latitude in grooming the spring stiffness of the gimbals to be less than the spring stiffness of the total ILS tail 33c. This approach also has the additional advantage of keeping the capacitance to ground of the traces constant along their length as well as under the termination pad. In today's ILS designs, the increase in surface area of the termination pads causes an increase in capacitance to ground which causes a large local increase in impedance. In turn, this creates a hurdle for increasing the data rate much beyond 2 GB/sec. Thus, the fingers 55 are "impedance groomed" with respect to the traces 47c.

In operation, the various embodiments of the present invention operate in substantially the same manner. The support layer 51 of the integrated lead suspension 41 defines a plane 71 (FIG. 18), and the second ends 47 of the conductors 43 are free to move out of the plane 71, as shown by arrows 73, independently with respect to the other ones of the second ends 47 of the conductors 43. More specifically, the second ends 47 of the conductors 43 are allowed to and may bend (again, see arrows 73) independently with respect to the other ones of the second ends 47 of the conductors 43. In addition, each of the second ends of the conductors are free to twist (see arrows 75) about their respective axes 49 independently with respect to the other ones of the second ends 47 of the conductors 43. Thus, each of the second ends 47 of the conductors 43 are free to gimbal in at least two degrees of freedom with respect to the other ones of the second ends 47 of the conductors 43. All embodiments are independent of the mounting device used to attach the head gimbal assembly.

The method of the present invention comprises terminating an integrated lead suspension 39 by providing a head gimbal assembly 31 having a tail 33 and a plurality of conductors 43, each of which has an end 47 with an axis 49. The method comprises supporting the ends 47 of the conductors 43 with the tail 33, such that the ends 47 of the conductors 43 are free to move independently with respect to other ones of the ends 47 of the conductors 43. The method also comprises biasing the tail 33 (such as by spring action, via the support layer 51) toward an arm electronics cable 35 (FIG. 18) having a plurality of pads 81 that correspond to the plurality of conductors 43 and ends 47. In addition, the method comprises independently moving each of the ends 47 to make contact with respective ones of the pads 81, and terminating the ends 47 to the respective ones of the pads 81.

As described above, the present invention also comprises allowing bending of the ends 47 of the conductors 43 out of the plane 71 defined by the tail 33 with respect to the other ones of the ends 47 of the conductors 43. Moreover, the present invention comprises twisting the ends 47 of the conductors 43 about their respective axes 49 independently with respect to the other ones of the ends 47 of the conductors 43. Thus, the ends 47 of the conductors 43 are gimbaling in at least two degrees of freedom with respect to the other ones of the ends 47 of the conductors 43. As shown in the embodiment of FIGS. 14–17, the method may also comprise providing the tail 33 with an opening 53c that is contoured to a shape of all of the ends 47c of the conductors 43c to define a plurality of apertures 53c for accommodating independent movement of all of the ends 47c of the conductors 43c, and a plurality of fingers 55, with each of the fingers 55 extending into one of the plurality of apertures 53c for providing additional support for a respective one of the ends 47c of the conductors 43c.

Figure 19:
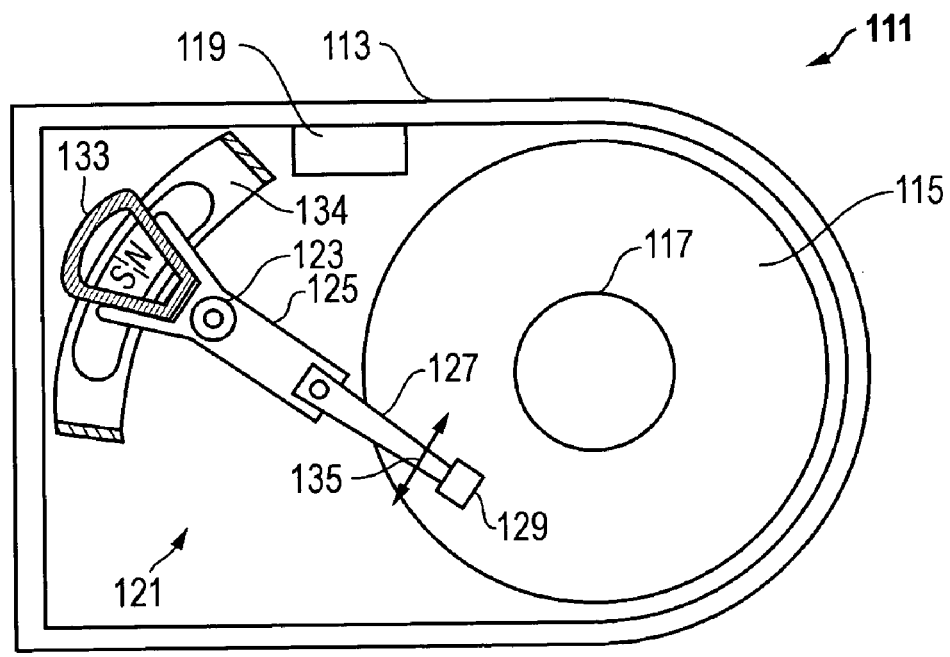
FIG. 19 is a schematic plan view of a hard disk drive constructed in accordance with the present invention.

Referring now to FIG. 19, a schematic drawing of one embodiment of an information storage system comprising a magnetic hard disk file or drive 111 for a computer system is shown. The present invention may be readily incorporated into drive 111, as described below. Drive 111 has an outer enclosure or base 113 containing a disk pack assembly comprising at least one magnetic disk 115. Disk 115 is rotated by a spindle motor assembly having a central drive hub assembly 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be nano size (approximately 850×700×230 microns) and is pre-loaded against the surface of disk 115 (in the range two to ten grams) by suspension 127.

Suspensions 127 have a spring-like quality which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

The present invention has many advantages over the prior art. The present invention overcomes the need to use thick, solder screened pads on ILS tails while still retaining the ability to accommodate any gaps or non-mating conditions between the ILS tails and A/E cables. Compliance between the ILS pads and A/E cables is provided for the individual pads such that the spring load of the ILS tail is able to overcome all gaps and non-mating conditions. As a result, the need for rework or "touch-up" is virtually eliminated. The present invention enables thin plating processes to be used to form the ILS pads instead of the conventional and thicker solder screening process. Plating processes form pads that are typically an order of magnitude thinner than solder pads, and have the additional benefits of less oxidation, elimination of toxic lead, and a greater choice of solder alloys.

A system, apparatus, and method of terminating an ILS tail to an A/E cable that is constructed in accordance with the present invention allows plated solder material to be utilized on the ILS pads by providing two additional degrees of freedom for the solder pads on the ILS tail. The additional degrees of freedom provide additional compliance between the individual pairs of solder pads that form the solder joints. In addition to a cantilever spring action in the ILS tail, the present invention comprises designs that allow each individual pad to move independently out of plane of the tail as well as providing a twist capability about its axis. In this way, each pad has its own gimbal structure, which may be provided through various embodiments.

Solder pad height change is not required with the present invention to achieve termination. However, if traditional screening of a solder alloy is still desired, the present invention may be implemented with only slight changes to the solder screening tooling. For example, currently, the continuous steel under the solder pads supports the copper ILS pads during the solder screening process. The solder is screened onto the ILS pads while all of the ILS suspensions are still in their panel form. The panel of ILS suspensions and their tails are aligned to the solder screening mask and registered against a platen. The platen in this invention requires raised portions coinciding with the ILS pad regions to support the copper pads during the solder screening process. This support is required so that the ILS copper pads do not deflect out of contact with the solder screen and, hence, produce solder bridging.

While the invention has been shown or described in only some of its forms, it should be apparent to those skilled in the art that it is not so limited, but is susceptible to various changes without departing from the scope of the invention

What is claimed is:

1. An integrated lead suspension, comprising:
   a tail having a plurality of conductors, each of the conductors having a first end extending from a head area, and a second end with an axis, such that the tail supports the second ends of the conductors, the tail further comprising:
   a support layer having at least one aperture formed therein for allowing each of the second ends of the conductors to move independently with respect to each of the other second ends of the conductors; and
   an insulation layer formed between portions of the conductors and the support layer for preventing contact therebetween.

2. The integrated lead suspension of claim 1, wherein the support layer defines a plane, and wherein the second ends of the conductors are free to move out of the plane independently with respect to the other ones of the second ends of the conductors.

3. The integrated lead suspension of claim 2, wherein the second ends of the conductors bend independently with respect to the other ones of the second ends of the conductors.

4. The integrated lead suspension of claim 1, wherein each of the second ends of the conductors are free to twist about their respective axes independently with respect to the other ones of the second ends of the conductors.

5. The integrated lead suspension of claim 1, wherein each of the second ends of the conductors are free to gimbal in at least two degrees of freedom with respect to the other ones of the second ends of the conductors.

6. The integrated lead suspension of claim 1, wherein the at least one aperture is a single rectangular opening formed in the support layer for accommodating independent movement of all of the second ends of the conductors.

7. The integrated lead suspension of claim 1, wherein the at least one aperture formed in the support layer comprises a plurality of apertures, each of which accommodates independent movement of one of the second ends of the conductors.

8. The integrated lead suspension of claim 1, wherein the at least one aperture is a single asymmetrical opening that is contoured to a shape of all of the second ends of the conductors to define a plurality of apertures for accommodating independent movement of all of the second ends of the conductors.

9. The integrated lead suspension of claim 8, wherein the support layer has a plurality of fingers, each of which extends into one of the plurality of apertures for providing additional support for a respective one of the second ends of the conductors, such that the fingers are impedance groomed with respect to the second ends of the conductors.

10. The integrated lead suspension of claim 1, wherein the insulation layer has an opening and a plurality of insulation pads formed in the opening for preventing contact between the support layer and the second ends of the conductors.

11. A head gimbal assembly, comprising:
a mounting device;
an integrated lead suspension mounted to the mounting device and having a read/write head, a tail, and a plurality of conductors, each of the conductors having a first end electrically interconnected with and extending from the read/write head, and a second end with an axis, such that the tail supports the second ends of the conductors, the tail further comprising:
a support layer having at least one aperture formed therein for allowing each of the second ends of the conductors to move independently with respect to each of the other second ends of the conductors;
an insulation layer formed between portions of the conductors and the support layer for preventing contact therebetween; and
the support layer defines a plane, and wherein the second ends of the conductors are free to move out of the plane independently with respect to the other ones of the second ends of the conductors.

12. The integrated lead suspension of claim 11, wherein the insulation layer has an opening and a plurality of insulation pads formed in the opening for preventing contact between the support layer and the second ends of the conductors.

13. The integrated lead suspension of claim 11, wherein the second ends of the conductors bend independently with respect to the other ones of the second ends of the conductors.

14. The integrated lead suspension of claim 11, wherein each of the second ends of the conductors are free to twist about their respective axes independently with respect to the other ones of the second ends of the conductors.

15. The integrated lead suspension of claim 11, wherein each of the second ends of the conductors are free to gimbal in at least two degrees of freedom with respect to the other ones of the second ends of the conductors.

16. The integrated lead suspension of claim 11, wherein the at least one aperture is a single rectangular opening formed in the support layer for accommodating independent movement of all of the second ends of the conductors.

17. The integrated lead suspension of claim 11, wherein the at least one aperture formed in the support layer comprises a plurality of apertures, each of which accommodates independent movement of one of the second ends of the conductors.

18. The integrated lead suspension of claim 11, wherein the at least one aperture is a single asymmetrical opening that is contoured to a shape of all of the second ends of the conductors to define a plurality of apertures for accommodating independent movement of all of the second ends of the conductors.

19. The integrated lead suspension of claim 18, wherein the support layer has a plurality of fingers, each of which extends into one of the plurality of apertures for providing additional support for a respective one of the second ends of the conductors, such that the fingers are impedance groomed with respect to the second ends of the conductors.

20. A hard disk drive, comprising:
an enclosure;
a disk pack assembly mounted to the enclosure and having a media storage disk that is rotatable relative to the enclosure;
an actuator movably mounted to the enclosure and having a head gimbal assembly including an integrated lead suspension, a read/write head, a tail extending from the integrated lead suspension, and a plurality of conductors, each of the conductors having a first end electrically interconnected with and extending from the read/write head, and a second end with an axis, such that the tail supports the second ends of the conductors, the tail further comprising:
a support layer defining a plane and having an asymmetrical opening that is contoured to a shape of all of the second ends of the conductors to define a plurality of apertures for accommodating independent gimbal movement of each of the second ends of the conductors, such that each of the second ends of the conductors have at least two degrees of freedom with respect to each of the other second ends of the conductors; and
an insulation layer formed between portions of the conductors and the support layer for preventing contact therebetween.

21. The hard disk drive of claim 20, wherein the insulation layer has an opening and a plurality of insulation pads formed in the opening for preventing contact between the support layer and the second ends of the conductors.

22. The hard disk drive of claim 20, wherein each of the second ends of the conductors are free to move out of the plane independently with respect to the other ones of the second ends of the conductors.

23. The hard disk drive of claim 20, wherein each of the second ends of the conductors are free to bend independently with respect to the other ones of the second ends of the conductors.

24. The hard disk drive of claim 20, wherein each of the second ends of the conductors are free to twist about their respective axes independently with respect to the other ones of the second ends of the conductors.

25. The hard disk drive of claim 20, wherein the support layer has a plurality of fingers, each of which extends into one of the plurality of apertures for providing additional support for a respective one of the second ends of the conductors, such that the fingers are impedance groomed with respect to the second ends of the conductors.

* * * * *